Oct. 27, 1931.  W. D. DEWEND  1,829,342
DISK HARROW
Filed March 25, 1929
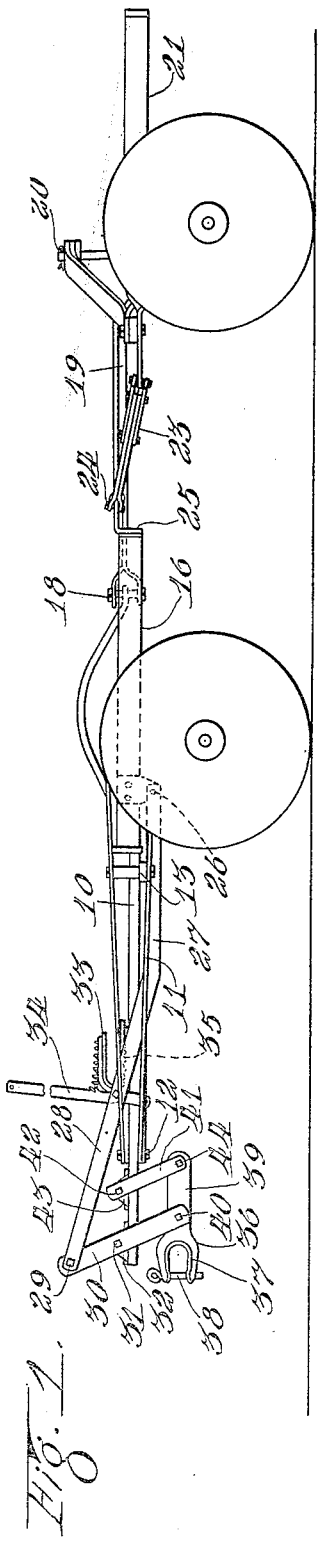
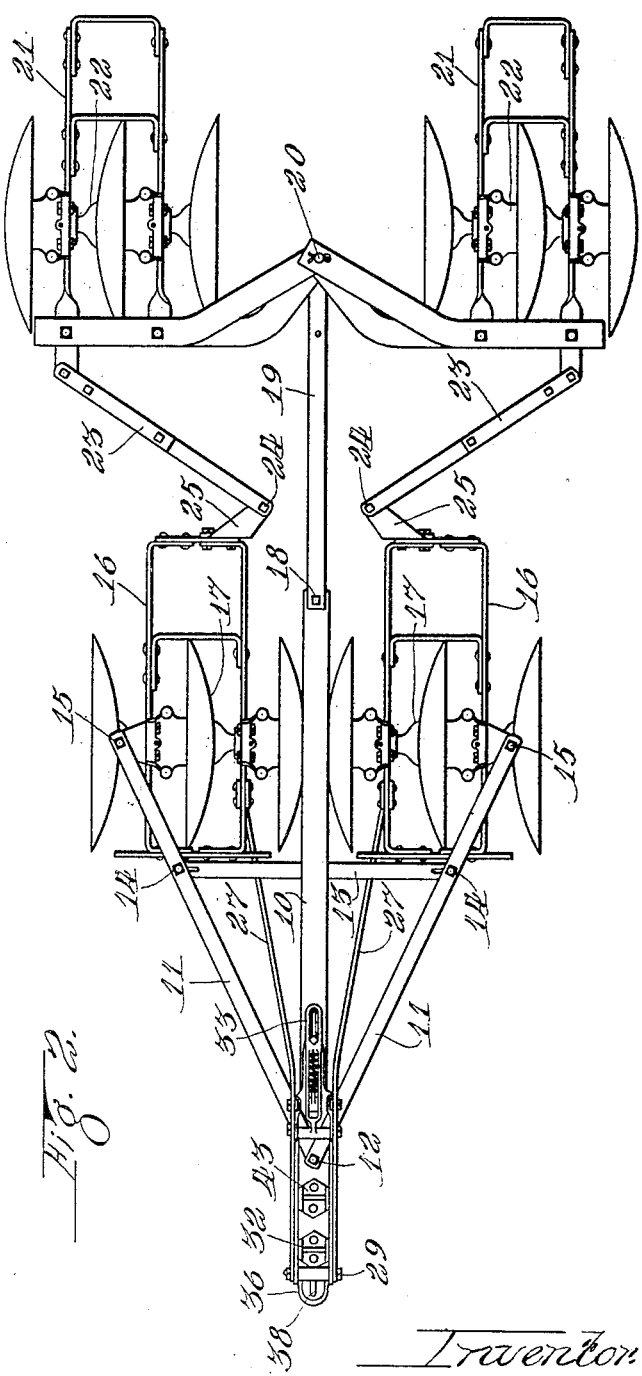
Inventor:
William D. Dewend.
By John P. Smith
Atty.

Patented Oct. 27, 1931

1,829,342

UNITED STATES PATENT OFFICE

WILLIAM D. DEWEND, OF SOUTH BEND, INDIANA, ASSIGNOR TO OLIVER FARM EQUIPMENT COMPANY, A CORPORATION OF DELAWARE

DISK HARROW

Application filed March 25, 1929. Serial No. 349,538.

The present invention is directed to a draft connection for tandem disk harrows in which the gangs of the disk harrow are angled by the draft of the tractor.

One of the objects of the present invention is to provide a novel and improved form of a draft connection for a tandem disk harrow in which the movable draft member or clevis forming the coupling connection between the harrow proper and the tractor, is held in parallel relation with the main draft member of the harrow during the angular movement of the disk gangs with respect to the harrow proper.

A further object of the invention is to provide a novel and improved draft connection between the harrow and the tractor in which the member forming the connection therebetween is prevented from buckling up on a backward movement of the tractor with respect to the harrow.

These and other objects are accomplished by providing a construction and an arrangement of the various parts in the manner hereinafter described and particularly pointed out in the appended claims.

Referring to the drawings, Fig. 1 is a side elevational view of a tandem disk harrow showing my improved draft connection embodied therein, and Fig. 2 is a top plan view of the same.

In illustrating one form of my invention, I have shown the same in connection with a draft actuated tandem disk harrow of the construction described and claimed in the application of Cameron H. Gemberling on a harrow hitch, Serial Number 285,180, filed June 13, 1928.

This harrow comprises a main draft member indicated by the reference character 10 and supplemental converging draft members 11 which have their forward end, as shown at 12, secured to the forward portion of the main draft member 10. Extending transversely of and secured to the main draft member 10, in any well known manner, is a bar 13 which has its outer ends as shown at 14 adjustably secured to the converging supplemental draft members 11. Pivoted at the rear end of the supplemental draft members 11 as shown at 15 are two forward disk gang frames generally indicated by the reference character 16. Mounted in these gang frames are the usual disk gangs generally indicated by the reference character 17. These two gangs 17 form the front rank of the tandem disk harrow. Pivotally connected as shown at 18 to the rear end of the main draft member 10, is a rearwardly extending draft link 19 to the rear end of which as shown at 20 are pivoted two rear gang frames generally indicated by the reference characters 21. These rear gang frames are provided with the usual disk gangs generally indicated by the reference characters 22. The outer ends of these gang frames are connected by adjustable links 23 which in turn have their forward ends as shown at 24 pivoted to the inner sides and rear portions of the front gang frame 16 by means of brackets 25. In the operation of angling the gangs from the parallel position shown in Fig. 1 to their working angle, it will, of course, be understood that the inner ends of the front disk gang 17, swing rearwardly about their pivots 15 on the supplemental draft members 11 and through the link connections 23 swing the outer ends of the rear disk gangs 22 rearwardly about the common pivot 20 on the draft link 19.

Secured to the inner sides of the front gang frame 16 as shown at 26, are relatively movable longitudinally extending draft bars 27. The forward portion of these draft bars are bent upwardly as shown at 28 and extend above the forward portion of the main draft member 10 and have their forward ends as shown at 29 pivoted to levers 30. The levers 30 in turn, are pivoted as shown at 31 to the opposite sides of a U shaped bracket 32 secured to the forward end of the main draft member 10. Mounted between the relatively movable draft bars 27 and secured thereto in any well known manner, is a yoke member 33 in which is pivoted a lever 34 which may be operatively controlled by means of a rope from the operator's seat on the tractor. This lever is provided with a pawl for engaging a rack 35 for locking the disk gangs in various angular relation with respect to each other and in the manner specifically described and claimed in the co-pending application previously referred to.

The essential feature of the present invention is the provision of a novel draft connection between the tractor and the harrow which, by reason of its construction, is held in substantially parallel relation with respect to the main draft member of the tractor so that in the operation of backing the tractor, and straightening the gangs, the possibility of buckling up the connection between the tractor and the harrow is entirely eliminated. This construction comprises a relatively movable draft clevis 36 which is provided with a forward bifurcated portion 37 which is adapted to receive the draft bar of the tractor. The forward end of this bifurcated portion is apertured so as to receive a securing pin 38. The clevis 36 is provided with a rearwardly extending arm 39, to the intermediate portion of which, as shown at 40, is pivoted the lower ends of the levers 30. The draft clevis is normally held in parallel relation with respect to the main draft member 10 by means of links 41 which have their upper ends thereof as shown at 42 pivoted to the opposite sides of a U shaped bracket 43 which in turn, is secured to the top side of the main draft member 10 in spaced relation with respect to the first bracket 32. The lower ends of the links 41 are pivoted as shown at 44 with the rear end 39 of the draft clevis 36.

In the operation of the above construction, it will be readily seen that by having the links 41 pivoted to the main draft member 10 so as to form in effect, a parallel link arrangement in co-operation with the lower portion of the levers 30 that the draft clevis 36 moves in substantial parallelism with the main draft member 10 and that on a rearward movement of the tractor with respect to the harrow for straightening the disk gangs from their normal working position to their parallel position that the possibility of buckling the clevis is entirely eliminated and the possibility of breaking or distorting parts by this movement has been reduced to a minimum.

While in the above specification, I have described one embodiment which my invention may assume in practice, it will, of course, be understood that the same is capable of modification and that modification may be made without departing from the spirit and scope of my invention as expressed in the following claims.

What I claim as my invention and desire to secure by Letters Patent is:

1. In combination with a disk harrow, of a frame therefor, disk gangs pivoted to said frame, relatively fixed longitudinally extending draft members forming a part of said frame, relatively movable and longitudinally extending draft members connected to the free ends of said gangs, a lever pivoted to said fixed draft members and having one end connected to the other ends of said movable draft members, a draft clevis pivotally connected to the other end of said lever and a link having one end pivoted to said relatively fixed draft member and the other end pivoted to said draft clevis for maintaining said clevis in its movement in parallel relation with respect to said relatively fixed draft members.

2. In combination with a disk harrow, of a frame therefor, disk gangs pivoted to said frame, relatively fixed and longitudinally extending draft members forming part of said frame, relatively movable and longitudinally extending draft members connected to the free ends of said gangs, a lever pivoted intermediate its ends to the forward end of said fixed draft members, one end of said lever being connected to the forward ends of said movable draft members, a draft clevis pivotally connected to the lower end of said lever and a link having one end thereof pivoted to said relatively fixed draft member and the other end thereof pivoted to said draft clevis for forming a parallelogram construction so that said clevis moves in parallel relation with respect to said relatively fixed draft members.

3. In combination with a disk harrow, of a frame therefor, tandem disk gangs pivotally connected with said frame, a relatively fixed and longitudinally extending draft member forming a part of said frame, relatively movable and longitudinally extending draft members connected to the free end of certain of said gangs, a lever pivoted intermediate its ends to the fixed draft member and having its upper end pivotally connected to said movable draft members, a draft clevis pivoted intermediate its ends to the lower end of said lever and a link pivoted to said fixed draft member and spaced from the pivot of said lever, the lower end of said link being pivotally connected to the rear end of said draft clevis for maintaining said clevis in parallel relation in its movement with respect to said fixed draft member.

4. In combination with a disk harrow, of a frame therefor, tandem disk gangs pivoted to said frame, a relatively fixed longitudinal main draft member forming a part of said frame, relatively movable and longitudinally extending draft members connected to the free end of the front gangs, levers pivoted intermediate their ends to the forward end of and on the opposite sides of said fixed draft member, the upper end of said levers being pivotally connected to the said forward ends of said movable draft members, a draft clevis pivoted between and to the lower ends of said levers and links having their upper ends pivoted to and on the opposite sides of said relatively fixed draft member and having their lower ends pivotally connected to the rear end and on the opposite sides of said clevis for maintaining said clevis in parallel relation in its movement with respect to said fixed draft member.

5. The combination with a disk harrow comprising a frame, of disk gangs pivoted to said frame, relatively movable draft bars mounted on said frame and having their rear ends connected to said gangs, a parallel structure pivoted to said frame and operatively connected with said movable draft member, and a draft clevis pivotally connected to said parallel structure whereby said draft clevis moves in parallelism with respect to said frame.

In testimony whereof I have signed my name to this specification, on this 19th day of March, A. D. 1929.

WILLIAM D. DEWEND.